Patented June 30, 1936

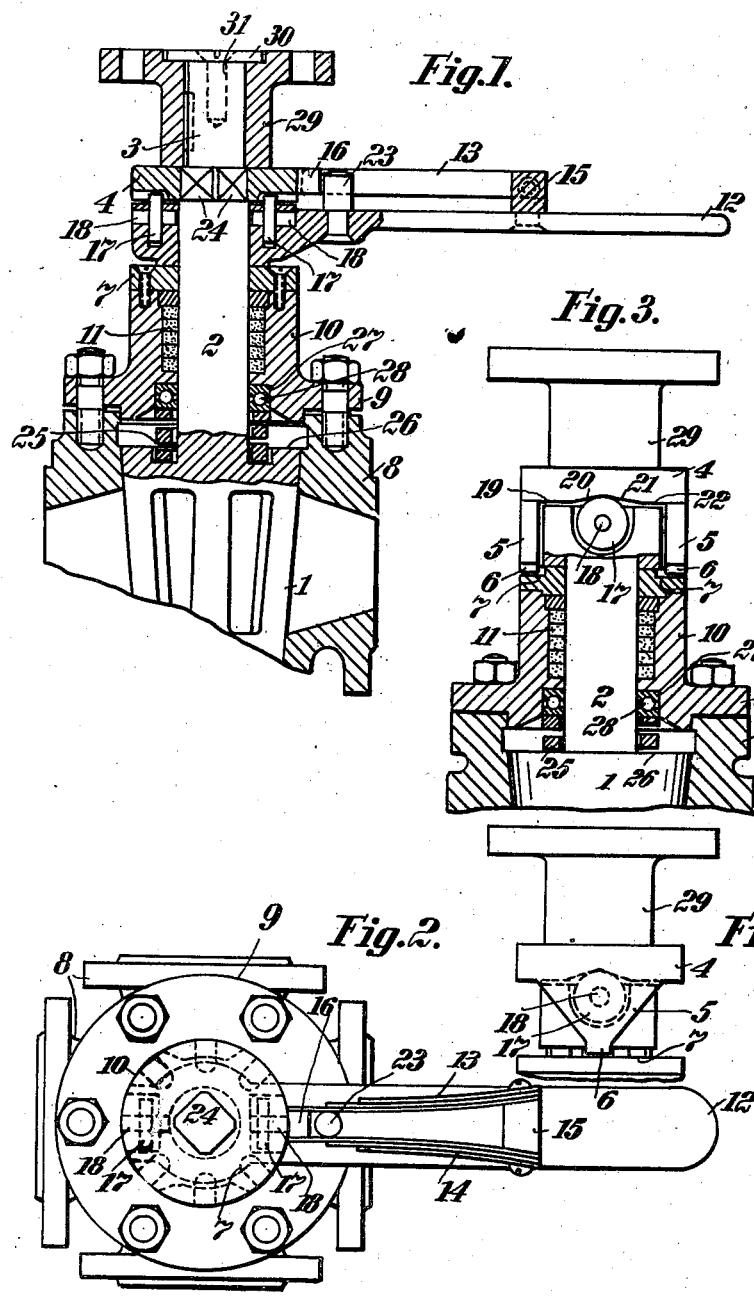

2,046,266

UNITED STATES PATENT OFFICE 2,046,266

VALVE

Gustav Huhn, Berlin-Tempelhof, Germany

Application February 9, 1935, Serial No. 5,835
In Germany February 12, 1934

5 Claims. (Cl. 251—97)

The invention relates to a plug cock the plug of which, preferably conical, is lifted off its seat in the box prior to the turning movement and, after terminating the rotation, is pressed into the seat. In cocks of this kind it is of special importance, that in each final position of the cock, i. e. in each "on" position and in each "off" position, the lifted-up plug be immediately and completely forced into its seat, because otherwise, leakages of the medium to be shut off would be unavoidable. This is of particular importance in connection with multiple-way cocks and with such cocks the solution of the problem is confronted by special difficulties, because within a comparatively short arc of turning movement, the cock-plug must be lifted up several times and completely replaced each time.

Through the present invention, this problem has been solved by a construction, in which at a turn of the wrench or handle, the plug is lifted axially without turning the plug, and after turning is forced back into its seat by means of a return-spring.

In accordance with the present invention, means are provided for positively preventing turning of the plug during its axial motion, and springs are interpolated between the cock drive and the plug, said springs being put under tension by the turning of the driving member which effects the axial motion of the plug, but being suddenly released when the axial motion is completed and the stopping means are released, effecting acceleration of the plug rotation to its next position.

By means of this acceleration, a jump-like transition from the axial motion of the cock-plug to the rotary motion will be attained, so that the cock-plug is jerked into the box seat in each position, and even when volatile media, such as gases, liquid fuel and the like are being controlled by the valve, a sufficient tightening will be attained, even if the opening of the cock be rapidly followed by the closing of the latter. Furthermore, in the present invention, the speed of rotation of the plug is independent of that of the cock handle or wrench, so that said handle or wrench may be mechanically actuated with a uniform rotary motion in one direction, causing the plug to rotate intermittently more rapidly than the cock handle.

In the accompanying drawing an example of performance of the object of the present invention has been represented, in which Fig. 1 represents a vertical section through the cock, Fig. 2 a plan view with the upper cap taken off, Fig. 3 a partial longitudinal section in a plane vertical to the section plane of Fig. 1.

Fig. 4 a partial lateral view of the upper part of Fig. 1.

The cock, represented in the abovementioned drawing is of the four-way type. Upon a square part 24 of the plug shank 2 a disk 4 has been attached which is rigidly connected with the shaft 2 by means of a hood 29 carried by the tapering part 3 of the plug-shank and which is pressed against the disk 4 by means of a screw 31 and the stop-plate 30. The disk 4 is provided on two sides, placed opposite to each other, with one suspending arm 5 each, the lower end of which forms a right-angled lug 6 engaging in corresponding gaps of the cover plate 7. The box cover 10, being connected with the plug box 8 by means of a flange 9, is provided with a stuffing box packing 11 intended to tighten the round part 2 of the plug shank. The shoulder 26 of the plug 1 is made to support a return spring 25, the other end of which abuts on a ball bearing 28, being housed within a groove of the box cover 10. The handle 12 encircles with a round hole 18. The round part of the cock shank 2 and carries, beside this hole, two rollers 17 placed diametrically to each other, adapted to be easily rotated round their pivots 18. These rollers establish contact with the inclined planes or cams 20, 21 and the horizontal planes 19, 22, with which the under surface of the disk 4 has been provided, so that in consequence of a rotation of the plug shank 2, the rollers 17 alternately lift and lower the disk 4.

The rotation of the plug shank 2 is effected from the cock handle 12 through the medium of a spring transmission. For this purpose the handle 12, is connected, by means of a bracket 15 (Fig. 2) with two laminated springs 13, 14 resting against a lug 16 of the disk 4. Furthermore, the handle 12 is made to carry a pin 23, engaging in-between the springs 13, 14.

The operation of the cock is as follows:

If the key handle 12 in Fig. 2 be moved clockwise, the spring 13 will be put under tension, the spring being stronger in its action than the return spring 25, and tends to turn the disk 4. This is, in the first instance, prevented by the straight guide 6, 7, as long as the rollers 17 are at the highest point of their path between the inclined parts 20, 21 of the disk 4. By causing the rollers 17 to roll off the inclined plane 20, the disk 4 and the plug will be lifted up, until the lugs 6 are disengaged from the guide groove of the cover plate 7. A turning of the plug shank 2 and of the plug 1 may then be effected, while the rollers 17 are running on the horizontal planes 19. This causes the spring 13 to be released, so that it snaps back into its original position, thereby rapidly driving the disk 4 and the plug shank 2 forward. As soon as the rollers are running again on the inclined plane 20, the resistance of the spring stop 16 will cease. This takes place shortly prior to the moment, when the lug 6 of the arm 5 of the disk 4 is placed again above a groove of the cover plate 7, so that the disk 4 is then locked so as to prevent its being further rotated and merely its axial motion in a downward direction is effected. By releasing the spring 13, the plug will thus suddenly be placed in the final position and forced back into its seat, even if the handle 12 be moved only slowly by hand. In connection with this plug re-seating, the return spring 25, put under tension by the more powerful spring 13 turning the disk 4 during the axial initial motion of the plug shank 2, is made to act freely, because it does not meet with any resistance now in the released spring 13. At a turning of the handle 12 in the opposite direction, the spring 14 will act in an identical manner. The springs 13, 14 also effect a smooth disengagement from the straight guide 6—7, so that the risk of the lugs 6 being sheared off at the commencement of the handle motion, will be obviated.

In the represented form of construction, the cover plate 7 is provided, as shown in Fig. 2, by means of dotted lines, with eight notches for holding the two lugs 6, and the disk 4 with such a number of cam faces 20, 21, that with every rotation of the key, the cock is raised four times and lowered four times, and the plug 1 is provided with four passages. Instead, however, another number of passages or ways for the multi-way cock may be provided and, if required, the cock may prove advantageous, as a simple one-way or straight-through cock.

This operation is characterized, on the one hand, by the shock-like replacement of the plug in its seat at an accurately pre-determined time or at the pre-determined final or working position of the cock, as well as by the idle play of the cock handle produced by the springs 13, 14, while locking the plug against a turning movement, whereby these springs are put under tension and thus accumulate the force subsequently required for turning the plug.

The represented form of construction may be subjected to various changes or modifications, without going beyond the limits of the present invention. Compared with the cocks with liftable plugs known so far, the cock in accordance with the present invention possesses the essential advantage that, if required, it can be actuated mechanically, or in other words, may be used as a regulating part adapted to be controlled by a machine. This is rendered possible by the fact, that in this construction uncontrollable obstructions, likely to disturb a mechanical drive, cannot possibly occur and that the required straight guide is not effected positively, but by the means of springs in a yielding manner. The cock may be actuated by means of any desired driving agent, such as motors, rope-pulleys, gear- or sprocket wheels, overhead shafting and the like, in connection with which the handle 12 may, if necessary, be designed as a disk or a wheel. Furthermore, also a drive by means of a fluid pressure agent, such as compressed air or steam, e. g. through the medium of cylinder pistons is possible. In this case, the cock key 12 may, f. i. be coupled with the piston rod in a suitable manner.

Having now particularly described and ascertained the nature of my said invention, I declare that what I claim is:—

1. In a plug cock comprising a casing with a conical bore, a tapered plug rotatably seated within said bore, a spring urging said plug in its seat in the bore, a stem rigidly connected with said plug and a rotatable operating member having a lost-motion connection with said stem, the combination of cam-faces coupled by elastic means with said operating member and rigidly connected with said stem, and rolling means mounted on said operating member and cooperating with said cam-faces for lifting up axially the said plug during the lost-motion of the operating means, and means for positively preventing a turning of said stem during the said lost-motion.

2. In a plug cock comprising a casing with a conical bore, a tapered plug rotatably seated within said bore, a spring urging said plug in its seat in the bore, a stem rigidly connected with said plug and a rotatable operating member having a lost-motion connection with said stem, a sleeve surrounding said stem and rigidly connected with said casing, a cover plate on said sleeve having right-angled recesses, a disk rigidly connected with said stem and having right-angled depending lugs adapted to engage into said recesses, the lower side of said disk forming cam surfaces, and laminated springs coupling said disk with said operating member, said operating member carrying rolls cooperating with said cam surfaces.

3. In a multi-way cock comprising a casing with a conical bore, a plural-passage tapered plug rotatably seated within said bore, a spring urging said plug in its seat in the bore, a stem rigidly connected with said plug and a rotatable operating member having a lost-motion connection with said stem, a sleeve surrounding said stem and rigidly connected with said casing, a cover plate on said sleeve having right-angled recesses, a disk rigidly connected with said stem and having right-angled depending lugs adapted to engage into said recesses, the lower side of said disk forming cam surfaces, and laminated springs coupling said disk with said operating member, said operating member carrying rolls cooperating with said cam surfaces, said cam surfaces comprising a plurality of alternate inclined planes and horizontal planes.

4. A valve comprising a casing, a valve member mounted for rotation and axial shifting in said casing, said valve member having a stem, spring means yieldably holding said valve member on its seat, coacting separably engaged means on said stem and casing for holding said stem and valve member against rotation until axially shifted to free said valve member from its seat, an operating member having a lost-motion connection with said stem allowing predetermined turning of said operating member with respect to said stem, means operatively connected with said stem and said operating member and actuated by said predetermined turning of said operating member for shifting said stem axially, thereby moving said valve member from its seat, disengaging said holding means and stressing said spring means, and additional spring means operatively connected with said stem and said operating member and stressed by said predetermined turning of the latter for rapidly turning the stem and valve member when said holding means are disengaged, the valve member being then re-seated and said holding means re-engaged by the first named spring means.

5. A valve comprising a casing having a seat, a valve member in the casing engaging said seat, said valve member being provided with a rigidly attached stem extending to the exterior of the casing, spring means acting axially on said valve member and stem to hold the former yieldably engaged with the seat, a disk secured on said stem in outwardly spaced relation with the casing, an operating member between said disk and casing and having a lost-motion connection with said stem, permitting predetermined turning of said operating member with respect to said stem, coacting separably engaged means on said disk and casing for holding said stem against rotation during said predetermined turning of said operating member, coacting means on said operating member and disk for sliding the stem axially to unseat the valve member when said operating member is turned with respect to the stem, said axial sliding of said stem serving also to disengage said separably engaged holding means and to stress the aforesaid spring means, and additional spring means operatively connected with said operating member and disk and stressed by said predetermined turning of said operating member for rapidly turning the stem upon disengagement of said holding means, the first mentioned spring means being effective after said turning of the valve member and stem to re-seat said valve member and re-engage said holding means.

GUSTAV HUHN.